C. E. ARUNDEL.
SOAP LATHER GENERATING AND APPLYING DEVICE.
APPLICATION FILED OCT. 17, 1911.
1,023,708.
Patented Apr. 16, 1912.
6 SHEETS—SHEET 1.
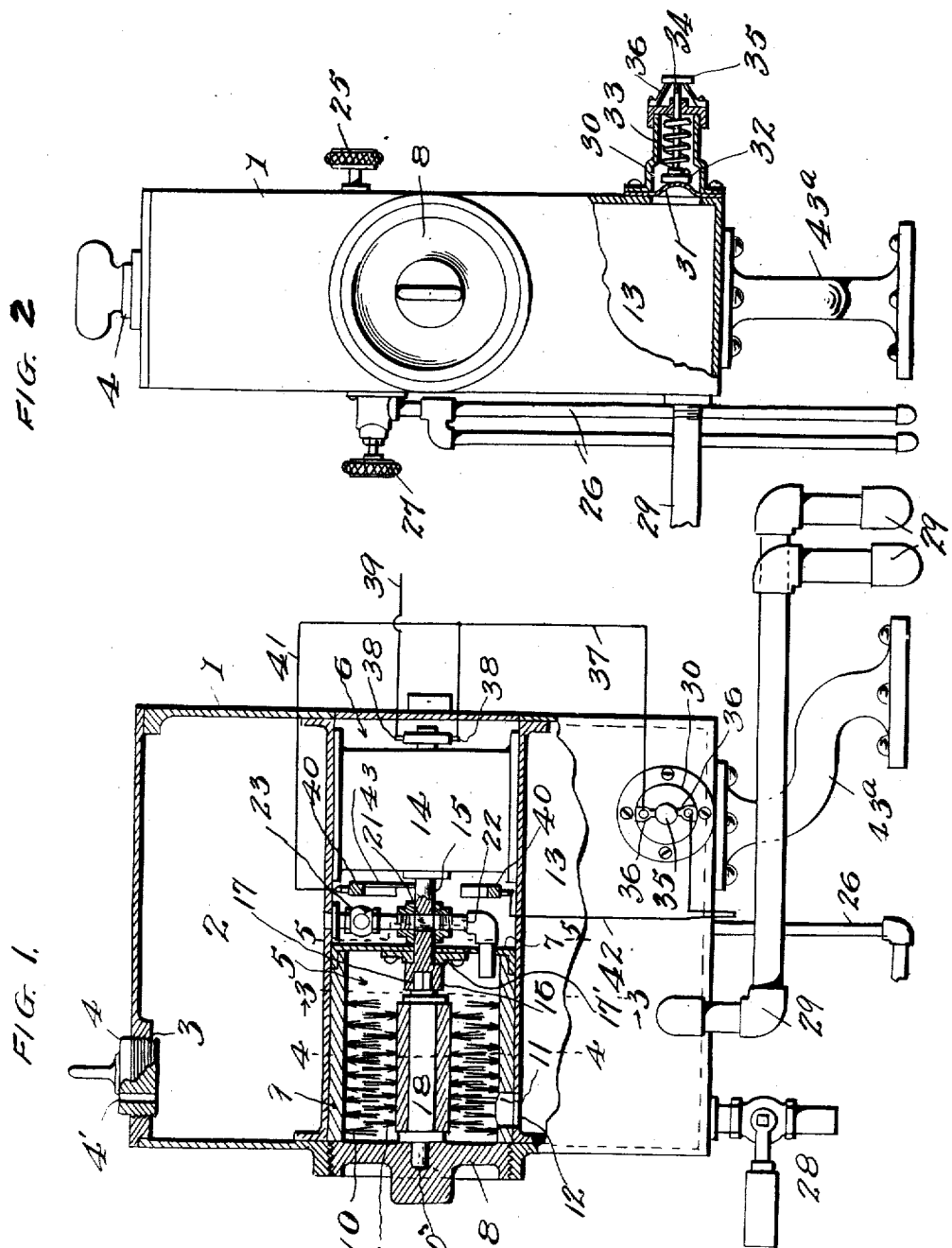
WITNESSES
C. K. Davies
B. M. Hubbleworth
INVENTOR
Clarence E. Arundel
C. L. Parker
Attorney

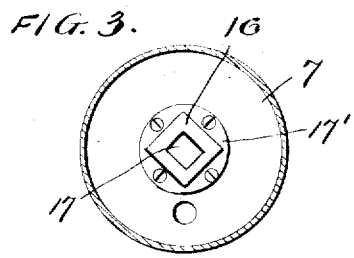
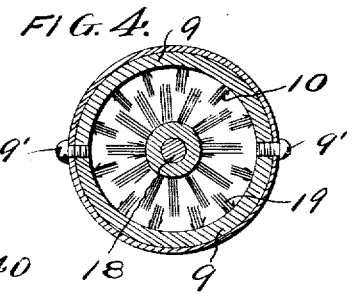
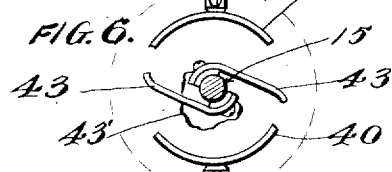
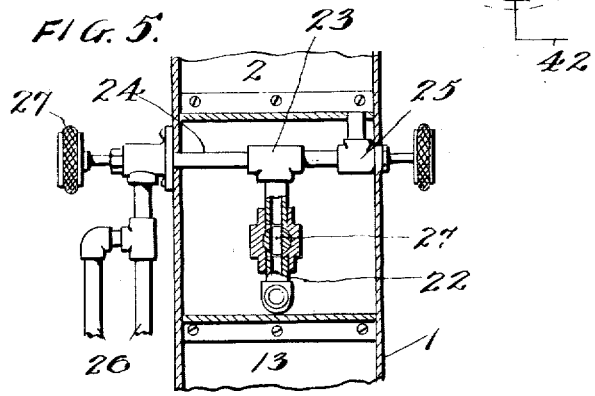
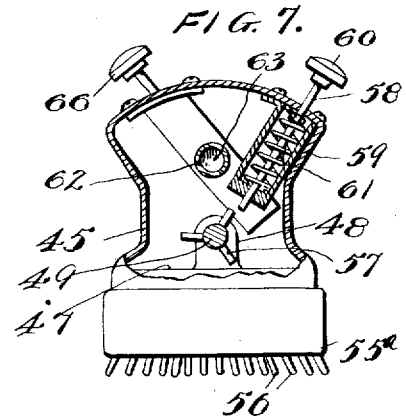
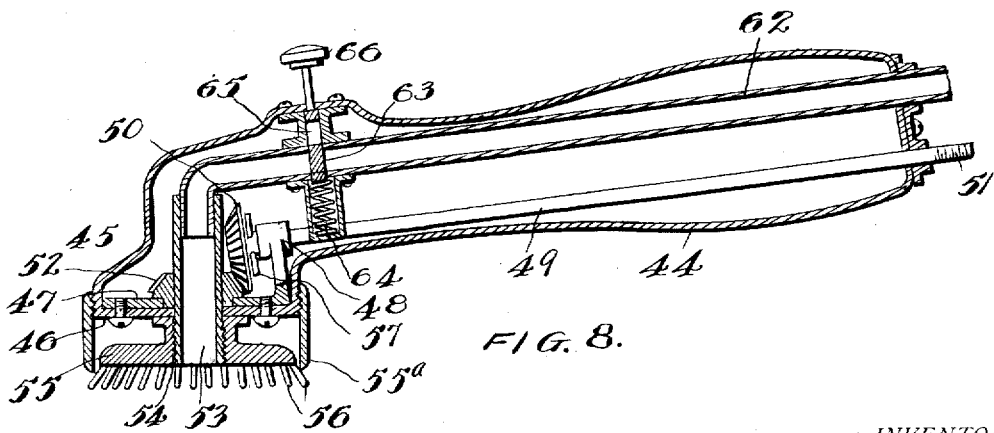

C. E. ARUNDEL.
SOAP LATHER GENERATING AND APPLYING DEVICE.
APPLICATION FILED OCT. 17, 1911.
1,023,708.
Patented Apr. 16, 1912.
6 SHEETS—SHEET 3.
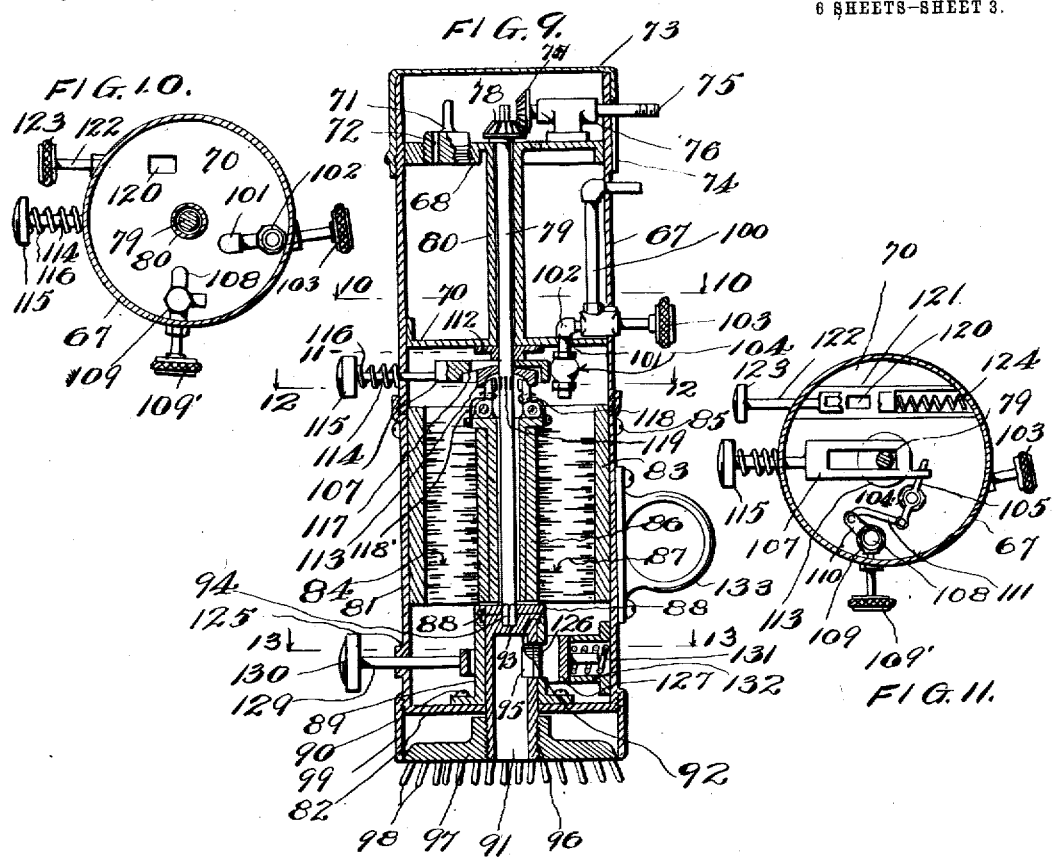
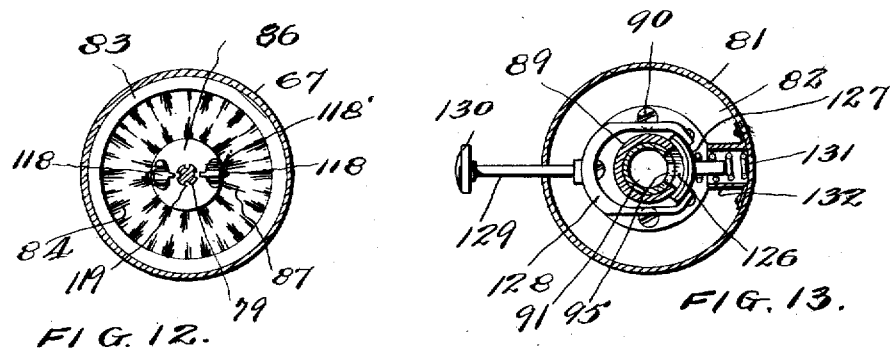
WITNESSES
INVENTOR
Clarence E. Arundel
Attorney

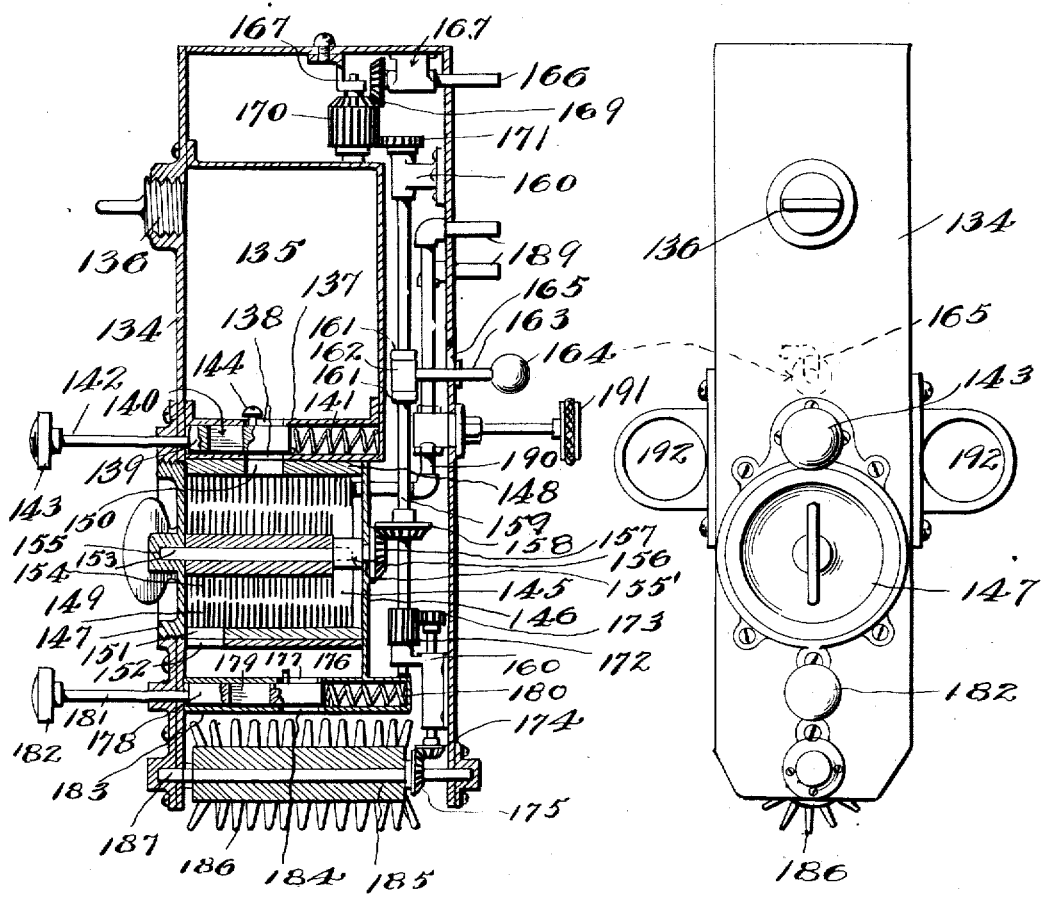

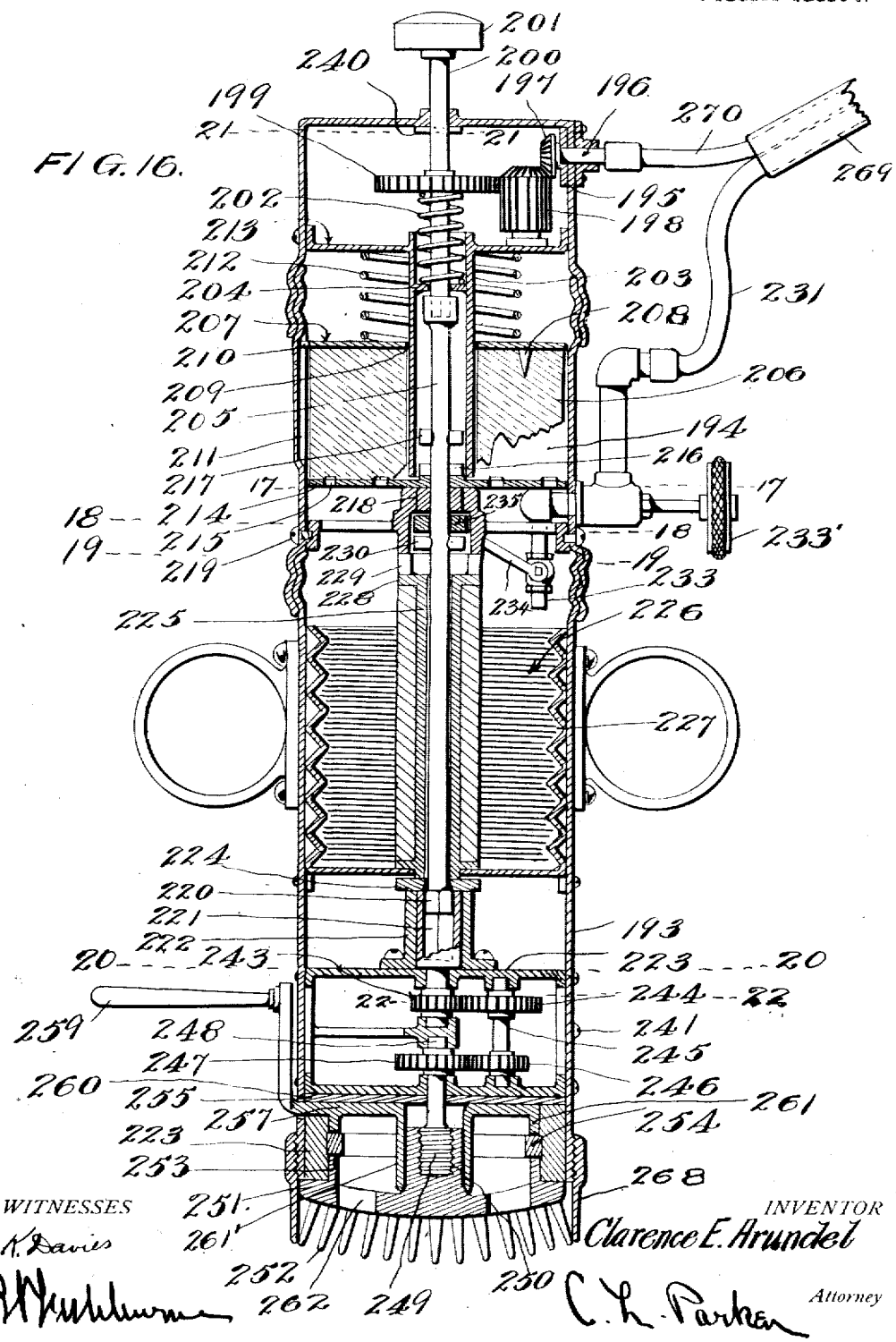

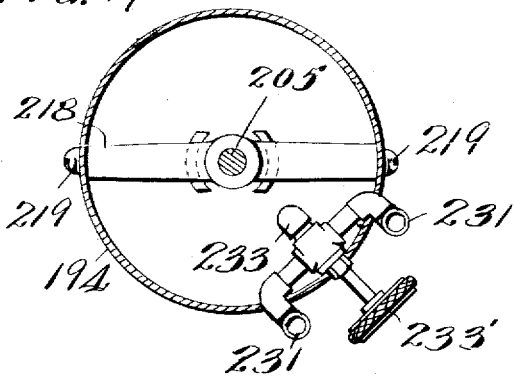
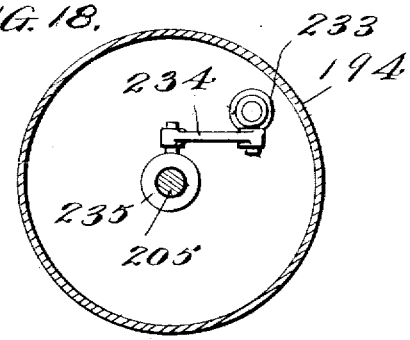
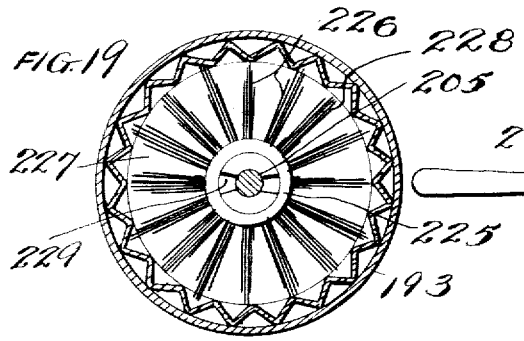
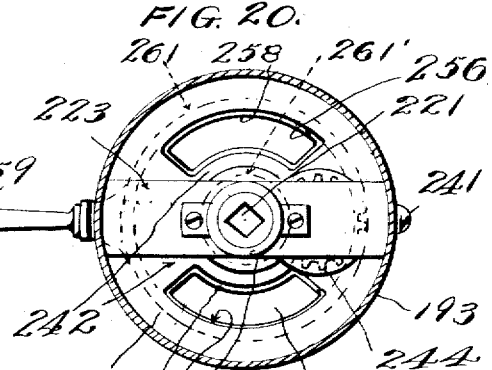
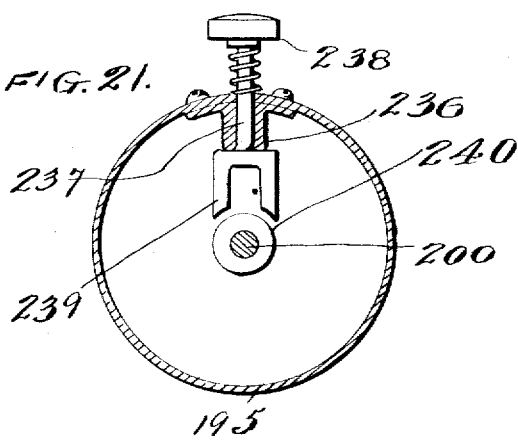
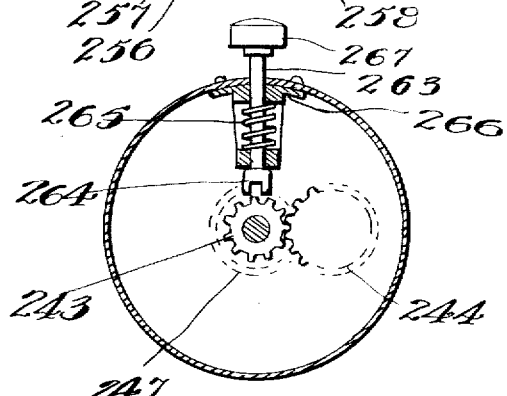

UNITED STATES PATENT OFFICE.

CLARENCE E. ARUNDEL, OF WASHINGTON, DISTRICT OF COLUMBIA, ASSIGNOR OF ONE-TWELFTH TO ARTHUR A. WRIGHT, ONE-TWELFTH TO ROSS L. RAY, AND ONE-SIXTH TO C. L. PARKER, ALL OF WASHINGTON, DISTRICT OF COLUMBIA.

SOAP-LATHER GENERATING AND APPLYING DEVICE.

1,023,708.   Specification of Letters Patent.   Patented Apr. 16, 1912.

Application filed October 17, 1911. Serial No. 655,209.

*To all whom it may concern:*

Be it known that I, CLARENCE E. ARUNDEL, a citizen of the United States, residing at Washington, in the District of Columbia, have invented certain new and useful Improvements in Soap-Lather Generating and Applying Devices, of which the following is a specification.

The present invention relates to means for generating soap lather and applying the same to the face, for the purpose of shaving.

The unsanitary condition ordinarily prevailing in barber shops is well known. A single brush and mug are employed to generate lather for shaving any number of persons. In this way the soap, the mug, and the brush become filled with germs and constitute the means for spreading disease.

It is therefore an important object of this invention to provide means of the above mentioned character, which will improve the unsanitary conditions now prevailing in barber shops, and expedite and render more easy the work of properly lathering the face.

A further object of the invention is to provide means for generating lather so constructed that the soap supply is kept absolutely clean and unused before it is converted into lather, whereby the waste in the use of soap is prevented.

A further object of the invention is to provide means to quickly generate lather in conjunction with means to supply the same to the face and properly rub the face in the presence of the lather.

Other objects and advantages of this invention will be apparent during the course of the following description.

In the accompanying drawings forming a part of this specification, and in which like numerals are employed to designate like parts throughout the same, Figure 1 is a front elevation of the lather generating device, shown partly in central vertical section, Fig. 2 is a side view of the device, the lower portion being shown in section, Fig. 3 is a transverse sectional view taken on line 3—3 of Fig. 1, Fig. 4 is a similar view, taken on line 4—4 of Fig. 1, Fig. 5 is a similar view taken on line 5—5 of Fig. 1, Fig. 6 is a detail view of contacts, Fig. 7 is an end view, partly in section, of the lather applying device, Fig. 8 is a central longitudinal sectional view through the same, Fig. 9 is a central longitudinal sectional view through a slightly modified form of the invention, Fig. 10 is a horizontal sectional view taken on line 10—10 of Fig. 9, Fig. 11 is a similar view taken on line 11—11 of Fig. 9, Fig. 12 is a similar view taken on line 12—12 of Fig. 9, Fig. 13 is a similar view taken on line 13—13 of Fig. 9, Fig. 14 is a central longitudinal sectional view through a third form of the invention, Fig. 15 is an end view of the same, Fig. 16 is a central longitudinal sectional view through a still different form of the invention, Fig. 17 is a horizontal sectional view taken on line 17—17 of Fig. 16, Fig. 18 is a similar view taken on line 18—18 of Fig. 16, Fig. 19 is a similar view taken on line 19—19 of Fig. 16, Fig. 20 is a similar view taken on line 20—20 of Fig. 16, Fig. 21 is a similar view taken on line 21—21 of Fig. 16, and, Fig. 22 is a similar view taken on line 22—22 of Fig. 16.

In the drawings wherein are illustrated preferred embodiments of my invention, attention being called first to Figs. 1 to 8, inclusive, the numeral 1 designates a preferably rectangular shell or casing constituting the body portion of the device. The upper portion of the casing 1 is in the form of a chamber 2 for holding the liquid soap, supplied therein through an opening 3, which is normally closed by a stopper 4 or the like, having an air inlet 4' formed therethrough. Disposed below the chamber 2 is a lather generating chamber 5 and a motor chamber 6, divided by a transverse partition wall 7, as shown. The outer end of the chamber 5 is formed open and is normally closed by a removable head 8, having screw-threaded engagement with the wall of the chamber 5, which is cylindrical. Disposed within the chamber 5 is an annular outer brush 9 carrying bristles 10. The brush 9 is held stationary by a screw 9' engaging the wall of the chamber 5 and is provided upon its lower side with an opening 11 in registration with an opening 12, which leads into a lather collecting chamber 13.

Disposed within the chamber 6 is a motor 14 of any well known or preferred type having an armature shaft 15 extending into chamber 5 and provided therein with a head 16, having an opening 17 formed upon one face, which opening is preferably square in cross-section. The armature shaft 15 is journaled through a bearing 17'. Disposed for rotation within the outer brush is an inner brush comprising a spindle 18 carrying bristles 19. The spindle 18 has one end thereof preferably formed square in cross-section and removably mounted in the opening 17. The opposite end of this spindle is cylindrical and is journaled in an opening 20 formed in the head 8.

The armature shaft 15 serves as a rotary valve and is provided with an opening 21, such opening being disposed within a supply pipe 22, as shown. The lower end of the supply pipe 22 extends into the lower portion of the chamber 5. The upper end of this pipe (see Fig. 6) is connected with a T-coupling 23, which is connected with a horizontal pipe 24, having one end thereof leading into the chamber 2. The supply of soap through the pipe 24 is controlled by a valve 25. Pipes 26 are connected at their upper ends and are also connected with a source of hot water (not shown) whereby hot water is continuously circulating in the pipes 26. One end of the pipe 24 is connected with the hot water pipes 26, as shown, and a valve 27 controls the supply of the hot water through the pipe 24.

The numeral 28 designates a spigot having communication with the lather connecting chamber 13. Pipes 29 also have communication with this chamber and lead to any desired points.

Automatic means are provided to stop the lather generating device when sufficient amount of the lather is stored in the chamber 13. When lather is made it expands and is capable of exerting considerable pressure. I provide the chamber 13 preferably near its bottom with a preferably cylindrical casing 30 having free communication with the chamber 13, as more clearly shown in Fig. 4. Within the casing 30 is disposed a flexible diaphragm 31, engaged by a plunger 32, opposed in its outward movement by a compressible coil spring 33, as shown. A rod 34 is connected with the plunger 32 and carries at its outer end a contact 35, which normally engages fixed contacts 36, as shown. A lead wire 37 having connection with one pole of a source of current, has these fixed contacts 36 connected in series therewith and the lead wire is connected with one brush 38 of the motor 14 and the other brush 38 has connection with lead wire 39, that is connected with the opposite pole of the source of current. Disposed near the inner end of the motor 14 are stationary contact segments 40, fixedly held and suitably insulated from the wall of the chamber 6. The upper segment 40 has connection with a wire 41 which is connected with lead wire 37 adjacent the brush 38. The other segment 40 has connection with a wire 42 which is connected with the lead wire 37 below and adjacent the contact 36. Contact fingers 43 are fixedly mounted upon the armature shaft 15 and are insulated from the armature shaft and are electrically connected by a wire 43'.

The entire device may be supported in any suitable manner but I have shown the same as supported by an arm 43$^a$, rigidly connected therewith.

In Figs. 7 and 8 I have shown a device for supplying the lather to the face and properly rubbing the face in the presence of the lather. This device comprises a casing 44 of a convenient shape and size to be held in the hand. The casing 44 has one end thereof bent downwardly, as shown at 45 and this end is closed by a head 46, upon which is rigidly mounted a disk 47. The disk 47 carries an upstanding lug 48, apertured as shown, to form a bearing for a rotatable shaft 49, carrying at its inner end a bevel gear 50. The shaft 49 has its outer end screw-threaded, as shown at 51 for suitable connection with a flexible driving shaft (not shown). The bevel gear 50 engages a bevel gear 52, rigidly mounted upon a rotatable pipe 53, journaled through the disk 47 and having its free end screw-threaded, as shown at 54, for detachable connection with a rubbing element 55. This rubbing element carries flexible tips or bristles 56, which are preferably formed of rubber. The shaft 49 is provided adjacent the bevel gear 50 with fingers 57, adapted to be engaged by a reciprocatory rod 58, operating in a fixed cylinder 59 and carrying at its outer end a button 60. The rod 58 is normally held out of the path of travel of the fingers 57 by means of an expansible coil spring 61. When the rod 58 is employed to hold the shaft 49 against rotation, the operator may unscrew the element 55 to remove the same from the pipe 53.

The numeral 62 designates a pipe which extends longitudinally of the casing 44 and has one end thereof bent downwardly to fit within the rotatable pipe 53. The pipe 62 has connection with the discharge end of the pipe 29 by means of a flexible hose (not shown). The passage of lather through the pipe 62 is controlled by a valve 63, which is normally held in its closed position by a spring 64. The valve 63 may be forced inwardly so that the opening 65 will come into registration with the opening of the pipe 63 by the operator pressing on the button 66.

The operation of this form of the invention is as follows:—The valves 25 and 27 are manipulated to supply a suitable amount of the liquid soap and hot water through the pipe 22 into the chamber 5, which supply is intermittently cut off by the armature shaft 15. The rotation of the brush 18 quickly converts the soap and hot water into lather which discharges through openings 11 and 12 into the chamber 13. This lather may now be withdrawn through either of the pipes 28 and 29. When the amount of lather in the chamber 13 exceeds a certain limit, the diaphragm 31 is forced outwardly, causing plunger 32 and rod 34 to move outwardly whereby the engagement of the contact 35 with contacts 36 is broken. It is obvious that the current cannot now be supplied to the motor through the wire 37. The current will now pass through wire 42, through the lower segment 40, contact fingers 43, the upper segment 40 and through wire 41 to the lower brush 38. It is thus seen that current is supplied to the motor until the fingers 43 disengage the segments 40, as shown in Fig. 6, at which time the current is cut off and the armature and brush 18 almost instantly stops, which is due to the frictional engagement between the inner and outer brushes 9 and 18. Attention is called to the fact that when the fingers 43 disengage segments 40, the armature shaft 15 will be turned so that the opening 21 is disposed horizontally and the supply of material through pipe 22 cut off.

When the device shown in Figs. 7 and 8 is used, the lather passes through pipe 62 and discharges through the rotatable pipe 53 onto the face below the rotating element 55, which properly rubs the face in the presence of the lather.

In the modified form of my invention, as shown in Figs. 9 to 13, inclusive, the lather generating device and lather applying means are both suitably mounted in the same shell or casing, and are accordingly movable as a single unit. This shell or casing comprises an upper casing 67 having its upper end closed by a head 68 and its extreme lower end formed open and internally screw-threaded, as shown at 69. The casing 67 is provided with a partition wall 70, forming a closed receptacle with the casing 67, to hold the liquid soap, which is supplied therein through an opening formed in the head 68 and closed by a removable stopper 71, provided with an air opening 72. A removable cap 73 is normally mounted upon the upper end of the casing 67 and has a slot 74 formed therethrough to allow of the passage of a shaft 75, journaled through fixed bearings 76 and carrying at its inner end a bevel gear 77. The shaft 75 has connection with and is driven by a flexible driving shaft (not shown). The bevel gear 77 engages a bevel gear 78, fast upon a central rotatable shaft 79, extending through a sleeve or tube 80 disposed centrally within the soap containing receptacle. The main shell or casing further comprises a lower casing 81, having its lower end closed by a head 82 and its upper end screw-threaded for detachable engagement with the screw-threaded portion 69 of the upper casing 67, as shown. The shaft 79 extends axially through the lower casing 81. Removably mounted within the casing 81 is an outer annular brush comprising an annular body portion 83, carrying bristles 84 and held in place by screws 85 or the like. Operating within this fixed outer annular brush is a rotatable inner brush, comprising a sleeve 86 which is loosely mounted upon the shaft 79 and carries bristles 87. The lower end of the sleeve 86 slidably engages a ring 88, disposed upon the upper end of a fixed sleeve or bearing 89, rigidly connected with the head 82 by screws 90 or the like. Rotatably mounted within the sleeve 89 is a nozzle 91 provided at its upper end with an annular flange 92 fitting within a counter-bore of the sleeve 89 and held from displacement by the ring 88. The flange portion 92 is provided with an opening 93, preferably square in cross-section to removably receive lower end 94 of the shaft 79, which lower end is also square in cross-section. The nozzle 91 is provided intermediate its ends with openings 95 and the lower end of this nozzle is formed open and is externally screw-threaded, as shown at 96, for detachable connection with a face rubbing element 97, carrying teeth or tips 98, formed of rubber or the like. Attention is called to the fact that the teeth 98 are so arranged that some of them will move the lather outwardly while the others will move it inwardly, when the element 97 is rotated. A ring 99 formed of rubber or the like is suitably attached to the lower end of the casing 81, to prevent the rubbing element 97 from coming in contact with the nose or other features.

The numeral 100 designates two hot water supply pipes which enter the casing 67 and extend downwardly and have their lower ends connected together. These pipes 100 are connected with a source of hot water which is constantly circulated through the same. A pipe 101 extends through the head 70 and leads into the upper end of the casing 81 to discharge into the outer annular brush, as shown. The pipe 101 has connection with the pipes 100 through the medium of a T-coupling 102 and a valve 103 controls the supply of the hot water. The pipe 101 is provided at its lower end with a valve 104, operated by a handle 105, fitting within an opening 106 formed in a reciprocatory frame 107. A soap supply pipe 108 extends through the head 70 and leads into the shell 81 to discharge the liquid soap into the outer annular brush. The pipe 108 is provided with a valve 109 operated by a handle 110 connected with the handle 105 through the medium of a link 111. When the handle 105 is moved for opening or closing the valve 104 the handle 110 is simultaneously moved to open and close the valve 109. The frame 107 straddles the shaft 79 and is confined between a fixed ring 112 and a movable ring 113. The frame 107 carries a shaft 114 extending through the casing 67 and provided therebeyond with a push button 115. A compressible coil spring 116 is positioned between this button and the shell 67. The frame 107 is provided upon its lower faces with a shoulder 117 adapted to be moved into engagement with the ring 113 to force the same downwardly into engagement with pawls 118, pivotally mounted upon the upper end of a sleeve 86 and having their free ends provided with teeth movable into engagement with teeth 119 formed upon the shaft 79. These pawls 118 are moved outwardly, when released by the ring 113, through the medium of springs 118'. When the ring 113 is thus moved downwardly, the pawls 118 are swung inwardly and their teeth fitting between the teeth 119 rigidly lock the sleeve 86 with the shaft 79. From the description of the above referred to parts, it is obvious that common means are provided for simultaneously supplying the liquid soap and hot water to the brushes and for locking the inner brush to the shaft 79. The head 70 is provided with an additional soap supply opening 120, controlled by a reciprocatory valve 121, carrying a stem 122 provided with a button 123. A spring 124 normally holds this valve in its closed position. Suitable means are provided to hold the valve in place and guide it in its movement.

The lower portion 125 of the casing 81 serves as a lather collecting receptacle. The sleeve 89 has an opening 126 formed therein through which the lather passes to the openings 95 and then through the nozzle 91. The opening 126 is normally closed by a valve in the form of a curved plate 127, attached to a frame 128, surrounding the sleeve 89, as shown. The frame 128 is provided with a stem 129 extending through the casing 81 and provided exteriorly thereof with a button 130. The valve 127 is opposed in its opening movement by a spring 131 disposed in a fixed housing 132. The shell or casing may be provided with any suitable number of elements 133 to receive the thumb and fingers of the operator.

The operation of this form of my invention is as follows:—The shaft 75 is set in rotation and this rotation is imparted to the shaft 79. Valve 103 and valve 109' are now open. The operator presses the button 115 inwardly which simultaneously opens valves 104 and 109 and at the same time operates pawls 118 to clutch the inner brush to the shaft 79. Soap and hot water are now fed into the brushes while the inner brush is being rotated. As the lather is generated it is discharged into receptacle 125. When a sufficient amount is secured button 115 is released which cuts off the supply of soap and hot water and stops the rotation of the inner brush. The shaft 79 continues to rotate and carries with it the rubbing element 97. The operator now presses the button 130 inwardly to move valve 127 for uncovering the opening 126, whereby the lather is supplied into the opening 91 and then to the face. The element 97 is now placed in engagement with the face to rub the same in the presence of the lather. When button 130 is released the spring 131 automatically seats valve 127, to cut off the supply of lather. I provide a key (not shown) for engaging the upper end of the shaft 79 which is square in cross-section, as shown, to hold this shaft against rotation when unscrewing the element 97, to remove the same for the purpose of sterilizing it, or the like.

In Figs. 14 and 15, I have shown a third modified form of the invention, designed to employ powdered or granulated soap.

The numeral 134 designates an outer shell or casing constituting the body portion of the device. Disposed within the casing 134 is a chamber 135 for holding the powdered soap, which is fed therein through an opening closed by a removable stopper 136. The chamber 135 has two spaced bottom walls 137, provided with alined openings 138, as shown. Disposed to reciprocate between the walls 137 is a valve 139 having an opening 140 formed therein adapted to be brought into registration with the openings 138. The valve 139 is opposed in its opening movement by a spring 141 and is moved by a stem 142 carrying a button 143. An upstanding pin 144 is attached to the valve 139 to operate within the upper opening 138, to break up any lumps or cake of the soap formed adjacent such opening.

The lower opening 138 leads into the upper portion of a cylindrical lather generating chamber 145, having one end closed by a head 146 and its outer end formed open and normally closed by a removable head 147, having screw-threaded engagement with the wall of the chamber 145. Removably mounted within the chamber 145 is an outer annular brush comprising an annular body portion 148 carrying bristles 149 and held stationary by any suitable means. The annular body portion 148 has an upper opening 150 in registration with the opening 138 and a lower opening 151 in registration with an opening 152, as shown. Disposed for rotation within the outer brush is an inner brush comprising a spindle 153, carrying bristles 154. The outer end of this spindle is formed cylindrical and is rotatably mounted within a recess 155 formed in the head 147, as shown, while the opposite end of this spindle is formed square in cross-section and is removably mounted in a correspondingly shaped opening formed in a rotatable element 156, journaled in the head 146. Rigidly mounted upon the element 156 is a bevel gear 157, which is normally engaged by a bevel gear 158, rigidly mounted upon the vertical shaft 159, journaled through fixed bearings 160. The shaft 159 is capable of being moved longitudinally to disengage the bevel gears 157 and 158 and, in order that the shaft may be so moved it is provided with rings 161 fast thereon, between which is disposed a sleeve 162 loosely mounted on the shaft and provided with a stem 163 carrying a button 164. The stem 163 operates in a slot 165, provided in its upper portion with a shoulder whereby after the shaft 159 has been elevated it may be locked in such position by turning the stem 163 so that it is disposed upon the shoulder.

A horizontal shaft 166 is journaled through a fixed bearing 167 in the upper portion of the casing 134, and is driven by a flexible driving shaft (not shown). The shaft 166 has a gear 169 rigidly mounted thereon, engaging a gear 170, in constant engagement with a gear 171, rigidly mounted upon the upper end of the shaft 159. At its lower end this shaft carries a gear 172, having constant engagement with a gear 173, as shown. The gear 173 draws an intermediate gear 174, which engages a gear 175.

When the lather is generated it is discharged into a chamber 176, having its lower wall provided with an opening 177, which is normally closed by a reciprocatory valve 178, having an opening 179 formed therein and adapted to be brought into registration with the opening 177. The movement of the valve 178 inwardly is opposed by a spring 180. This valve is moved by a stem 181 carrying a button 182, as shown. Below the valve 178 is a wall 183, having an opening 184 formed therethrough in alinement with the opening 177. Disposed below the wall 183 is a face rubbing element comprising a cylindrical roller 185, provided upon its periphery with teeth or tips 186, which are formed of rubber. The roller 185 is mounted upon a shaft 187, journaled as shown. The gear 175 is rigid upon this shaft.

The numeral 189 designates hot water supply pipes which extend downwardly within the casing 134 and are connected together at their lower ends, as shown, and have connection with a source of hot water. A pipe 190 is connected with the pipes 189 and leads into an upper portion of the chamber 145. A valve 191 controls the passage of the hot water through the pipe 190.

The casing 134 may be provided with any suitable number of elements 192, for receiving the fingers of the operator.

The operation of this form of my invention is as follows:—The rotation of the shaft 166 is imparted to the shaft 159 which is kept constantly rotated. When this shaft is in its lowermost position, as shown, it drives the inner rotatable brush, through the medium of gears 157 and 158. The operator presses the button 143 inwardly to supply a desired amount of the powdered soap within the chamber 145 and manipulates the valve 191 to supply a sufficient amount of hot water to this chamber. The lather is generated and discharged through openings 151 and 152 into compartment 176. This lather may be supplied upon the teeth of the rubbing element 185 by forcing the button 182 inwardly. By moving the button 164 upwardly a corresponding movement is had of the shaft 159, to disengage bevel gears 157 and 158, whereby the rotation of the inner brush is stopped. Attention is called to the fact that the rubbing element 185 is still rotated.

In the form of the invention shown in Figs. 16 to 22, inclusive, the device is shown as comprising a casing formed of a lower section 193, an intermediate section 194, and an upper section or cap 195, the same having screw-threaded engagement with each other, as shown. A stub shaft 196 extends through the material of the cap 195 and is provided with a gear 197, engaging a gear 198, which in turn is engaged by a pinion 199, rigidly mounted upon a reciprocatory rotatable shaft 200. The shaft 200 carries at its outer end a swiveled button 201 and this shaft is normally held in its outer position by a compressible coil spring 202, engaging the pinion 199 and fitting within the upper portion of a sleeve or tube 203, as shown. The spring 202 engages a bottom wall 204 and the shaft 200 extends through an opening formed therein to have connection with a head formed upon the upper end of a reciprocatory rotatable shaft 205.

The numeral 206 designates a cake of soap in the form of an annulus and surrounding the sleeve 203, as shown. A locking plate or disk 207 is disposed upon the upper end of the cake of soap and is provided with downwardly extending teeth 208 stamped therefrom, which are embedded in the soap. The plate 207 is provided with a central opening 209 to receive the sleeve 203 and is also provided preferably at diametrically opposite points with tongues 210 fitting within vertically disposed slots 211 formed through the wall of the intermediate section 194. It is thus seen that the plate or disk 207 cannot rotate in its casing but is capable of longitudinal movement along the sleeve 203. A compressible coil spring 212 forces the disk 207 downwardly and also engages a partition wall 213 of the cap 195, as shown.

Operating in engagement with the lower end of the cake of soap is a rotatable cutter 214, having openings 215 formed therethrough and disposed, as shown, these openings having their walls forced upwardly slightly to form suitable blades to scrape the soap which passes through said openings 215 in the form of thin strings. The cutter 214 is provided centrally thereof with a hub which is loosely mounted upon the shaft 205 and carries upstanding teeth 216, constituting elements of a clutch device. The shaft 205 is provided with teeth 217, adapted to be moved downwardly in engagement with the teeth 216, whereby the cutter 214 is securely locked for rotation with the shaft 205.

Disposed below the cutter 214 is a fixed support or bearing 218, through which is journaled the shaft 205, as shown. This support is rigidly connected with the casing 194 by screws 219 or the like. The shaft 205 extends axially within the section 193 and is provided at its lower end with a head 220, which is preferably square in cross-section and is mounted to reciprocate within a socket 221, the opening of which is also square in cross-section. The socket 221 is rotatably mounted in a fixed bearing 222, which is secured upon the upper end of a housing 223 by means of screws or the like, as shown. A ring 224 is loosely mounted upon the lower end of the shaft 205, above and adjacent the head 220, as shown, and a sleeve or tube 225 is loosely mounted upon the shaft 205 between the ring 224 and the bearing 218, as shown. The sleeve 225 carries bristles 226 of a rotatable brush, operating in the lather generating compartment 227, which has its inner wall preferably corrugated, as shown. These corrugations are preferably in the form of pyramids and accordingly appear the same in horizontal and vertical cross-section, as shown in Figs. 16 and 19. The upper end of the sleeve 225 is provided with an enlarged head 228, which is provided at diametrically opposite points with openings 229, to receive teeth 230 formed upon the shaft 205, as shown. When the shaft 205 is forced downwardly, teeth 230 move into the openings 229 and lock the sleeve 225 to said shaft, whereby the rotatable brush is driven by the same.

The bearing 218 is shaped so that the shaved soap may fall past the same upon the rotatable brush.

The numeral 231 (see Fig. 16) designates hot water supply pipes connected at their lower ends to form with a source of hot water (not shown) a circulatory system. A pipe 233 has connection with the pipes 231 and a manually operated valve 233' is provided for controlling the passage of the water through the pipe 233. This pipe is also provided near its lower end with a valve operated by a handle 234, which handle is pivotally connected with a ring 235, said ring allowing shaft 205 to revolve therein but moving longitudinally with the shaft. When the shaft 205 is moved downwardly, lever 234 is thus moved and the hot water discharged from pipe 233 onto the rotating brush.

The lid or uppermost section 195 is provided with an element 236, (see Fig. 21) through which reciprocates a stem 237 carrying at its outer end a button 238 and at its inner end a catch 239, adapted for movement into and out of engagement with a ring 240, rigidly mounted upon the shaft 200.

The housing 223 is disposed within the lower end of the casing section 193, that serves as a lather collecting compartment. This housing is held against movement by screws 241 or the like. As clearly shown in Figs. 20 and 22, spaces 242 are provided upon opposite sides of the housing 223 to allow the lather to pass downwardly. Suitable speed reducing transmission gearing is arranged within the housing 223, comprising a small pinion 243 having rigid connection with the socket 221 and engaging a large pinion 244 rigidly mounted upon a shaft 245, provided at its lower end with a small pinion 246. This small pinion drives a large pinion 247 rigidly mounted upon a vertical stub shaft 248 carrying a screw-threaded head 249 at its lower end. This screw-threaded head engages within a screw-threaded opening 250 of a rotatable face rubbing element 251, carrying teeth or tips 252 formed of rubber or the like. The element 251 is provided upon its upper face with an upstanding annular flange 253 fitting within the lower portion of the housing 223 and engaging an annulus 254, as shown. A stationary plate 255 is disposed below the housing 223 and is provided with discharge openings 256 and a pivoted valve plate 257 is disposed below this stationary plate and has openings 258 adapted to be brought into and out of registration with the openings 256, by turning the plate 257, which may be accomplished by swinging a lever 259, operating through slot 260 in casing section 193. A guard segment 261 is carried by the lever 259 to prevent the lather from escaping through the slot 260. An annulus 261' surrounds the hub portion of the element 251, as shown. The element 251 is provided with openings 262 through which the lather passes to the face.

In Fig. 22 I have shown a stem 263, passing into the housing 223 and provided with a head 264 to engage the small pinion 243 to prevent its rotation. When this is done the element 251 may be unscrewed and hence removed to be sterilized or the like. A spring 265 engages a cross-pin 266 carried by the stem 263, whereby the stem is normally held in its outer position. This stem carries at its outer end a button 267.

A guard ring 268 is attached to the lower end of the casing section 193 and surrounds the element 251 to prevent it from coming in contact with the nose or other features.

In Fig. 16 I have shown a tubular casing 269, surrounding pipes 231 and a flexible driving shaft 270 which is connected with the shaft 196. The operation of this form of my invention is as follows: The shaft 196 imparts its rotation to the shaft 200 which in turn rotates the shaft 205. The element 251 is now rotating. When the shaft 200 is moved downwardly to its first position the sleeve 225 is locked with the shaft 205 to rotate therewith and the lever 234 is operated to supply hot water to the rotating brush. The device having been used before will generate the lather which descends into the lather collecting compartment. If more soap is needed to generate the lather, the shaft 200 is forced downwardly to its second position whereby the cutter 214 is locked to the shaft 205 and hence set in rotation. At the same time the lever 234 is further moved to increase the supply of hot water to the rotating brush. The cutter 214 shaves the soap from the cake which passes in the form of flakes or strings through the openings 215 and hence fall upon the rotating brush. The lather is supplied to the face by swinging the lever 259 to bring the openings 256 and 258 into registration, whereby the lather is supplied to the openings 262 and subsequently passes through the same. The supply of lather may of course be cut off by a reverse movement of lever 259.

I wish it understood that the forms of my invention herewith shown and described are to be taken as preferred examples of the invention and that certain changes in the shapes, sizes, and arrangements of parts may be resorted to without departing from the spirit of the invention or the scope of the subjoined claims.

Having thus described my invention, I claim:

1. In a machine of the character described, the combination with a receptacle for holding soap, of a lather generating receptacle to receive the soap from the first named receptacle, a rotatable brush disposed in the lather generating receptacle, a rotatable face rubbing element, and means for conducting the lather from the lather generating receptacle to said rotatable face rubbing element.

2. In a machine of the character described, the combination with a lather generating receptacle, of a rotatable brush disposed therein, a rotatable face rubbing element, common means to rotate the brush and face rubbing element, and means whereby the rotation of the brush may be prevented during the rotation of said face rubbing element.

3. In a machine of the character described, the combination with a lather generating receptacle, of an annular outer brush disposed therein and held against movement, a rotatable brush disposed within the outer annular brush, means for supplying soap and water to the brushes, and means to rotate the inner brush.

4. In a machine of the character described, a casing comprising an upper soap containing chamber, an intermediate lather generating chamber and a lower lather collecting chamber, a rotatable brush disposed within the lather generating chamber, a rotatable face rubbing element disposed below the lather collecting chamber, and a rotatable shaft extending longitudinally within the casing and serving as common means for rotating the brush and face rubbing element.

5. In a machine of the character described, a casing, an outer annular brush disposed therein, a rotatable shaft disposed in the casing and extending through the annular brush, an inner brush disposed within the outer brush and loosely mounted upon the shaft, means to lock the inner brush to the shaft for rotation therewith, and means to supply soap and water to the brush.

6. In a machine of the character described, a casing, an outer annular brush disposed therein, a rotatable shaft disposed in the casing and extending through the annular brush, an inner brush disposed within the outer brush and loosely mounted upon the shaft, clutch mechanism for locking the inner brush to the shaft, means for supplying soap and water to the brushes, and common means for operating said means and mechanism.

7. In a machine of the character described, a lather generating receptacle, a movable agitating element therein, means to move the agitating element to produce lather, and means for receiving and holding the lather with the exclusion of the air.

8. In a machine of the character described, the combination with a lather generating device, of a receptacle to receive the lather therefrom and hold it with the exclusion of the air, and means to withdraw the lather from said receptacle.

9. In a machine of the character described, the combination with a substantially hermetically sealed lather generating receptacle, of a movable agitating element disposed to operate therein, means to move said agitating element, and means to control the discharge of lather from said lather generating receptacle.

In testimony whereof I affix my signature in presence of two witnesses.

CLARENCE E. ARUNDEL.

Witnesses:
  B. P. FISHBURNE,
  C. W. PARKER.